(12) United States Patent
Iwasaki

(10) Patent No.: US 7,814,319 B2
(45) Date of Patent: Oct. 12, 2010

(54) DEVICE AND METHOD FOR INFORMATION COMMUNICATION, SYSTEM AND METHOD FOR SUPPORTING INFORMATION EXCHANGE AND HUMAN RELATION FOSTERING, AND COMPUTER PROGRAM

(75) Inventor: Jun Iwasaki, Tokyo (JP)

(73) Assignee: Sony Corporation, Tokyo (JP)

( * ) Notice: Subject to any disclaimer, the term of this patent is extended or adjusted under 35 U.S.C. 154(b) by 806 days.

(21) Appl. No.: 10/627,733

(22) Filed: Jul. 28, 2003

(65) Prior Publication Data
US 2004/0073535 A1    Apr. 15, 2004

(30) Foreign Application Priority Data
Jul. 30, 2002    (JP) .............................. 2002-221572

(51) Int. Cl.
*H04L 29/06*    (2006.01)

(52) U.S. Cl. .................. 713/166; 713/164; 707/530; 705/27; 709/200

(58) Field of Classification Search ................ 713/166, 713/164
See application file for complete search history.

(56) References Cited

U.S. PATENT DOCUMENTS

| | | | | |
|---|---|---|---|---|
| 5,572,673 | A * | 11/1996 | Shurts ......................... | 726/17 |
| 6,185,534 | B1 * | 2/2001 | Breese et al. ................ | 704/270 |
| 6,199,099 | B1 * | 3/2001 | Gershman et al. ........... | 709/203 |
| 6,272,467 | B1 * | 8/2001 | Durand et al. ................ | 705/1 |
| 6,404,438 | B1 * | 6/2002 | Hatlelid et al. .............. | 345/473 |
| 6,504,920 | B1 * | 1/2003 | Okon et al. ............ | 379/121.01 |
| 6,606,708 | B1 * | 8/2003 | Devine et al. .................. | 726/8 |
| 6,915,282 | B1 * | 7/2005 | Conway et al. ............... | 706/12 |
| 6,986,043 | B2 * | 1/2006 | Andrew et al. .............. | 713/166 |
| 7,051,212 | B2 * | 5/2006 | Ginter et al. ................ | 713/193 |
| 7,103,915 | B2 * | 9/2006 | Redlich et al. ................ | 726/27 |
| 7,140,044 | B2 * | 11/2006 | Redlich et al. ................ | 726/27 |
| 7,188,243 | B2 * | 3/2007 | Shell et al. ................... | 713/166 |
| 7,315,764 | B1 * | 1/2008 | Sutardja et al. ............... | 700/94 |
| 7,529,931 | B2 * | 5/2009 | Vasishth et al. ............. | 713/166 |

(Continued)

FOREIGN PATENT DOCUMENTS

JP    2001-195430    7/2001

OTHER PUBLICATIONS

Haruhiko Hiramatsu, et al. "Reconstruction of Contents for Communication in Mobile Environment"; Information Processing Society Memoir (2002—DBS—128s); Information Processing Society of Japan; Jul. 14, 2002; vol. 2002; No. 67; pp. 115-122.

(Continued)

*Primary Examiner*—Farid Homayounmehr
(74) *Attorney, Agent, or Firm*—Oblon, Spivak, McClelland, Maier & Neustadt, L.L.P.

(57) ABSTRACT

Face-to-face information exchange and fostering of human relations implemented by communication through the virtual world are favorably supported. A user's personal information or other real-world information related to the user is taken one after another into a portable device with memory incorporated. Further, data is taken out of the device and matched with data from another user's device. Thus, information exchange and fostering of human relations are supported in the real world through the virtual world. For example, the present invention is used to provide places for intra-generational and intergenerational encounters or to build message boards for job hunting activities or looking for a match.

12 Claims, 12 Drawing Sheets

U.S. PATENT DOCUMENTS

| | | | |
|---|---|---|---|
| 2001/0034708 A1* | 10/2001 | Walker et al. | 705/51 |
| 2002/0077062 A1* | 6/2002 | An et al. | 455/41 |
| 2002/0083119 A1* | 6/2002 | Matsui et al. | 709/200 |
| 2002/0107895 A1* | 8/2002 | Timmer | 707/530 |
| 2004/0073535 A1* | 4/2004 | Iwasaki | 707/1 |
| 2004/0203363 A1* | 10/2004 | Carlton et al. | 455/41.2 |
| 2008/0162352 A1* | 7/2008 | Gizewski | 705/50 |

OTHER PUBLICATIONS

Hiramatsu Haruhiko, et al. "Reconstruction of Content for Communication in Mobile Environment", Information Processing Society of Japan, (2002-DBS-1.2.8); Jul. 17-19, 2002; vol. 2002, No. 67, pp. 115-123.

* cited by examiner

F I G. 2
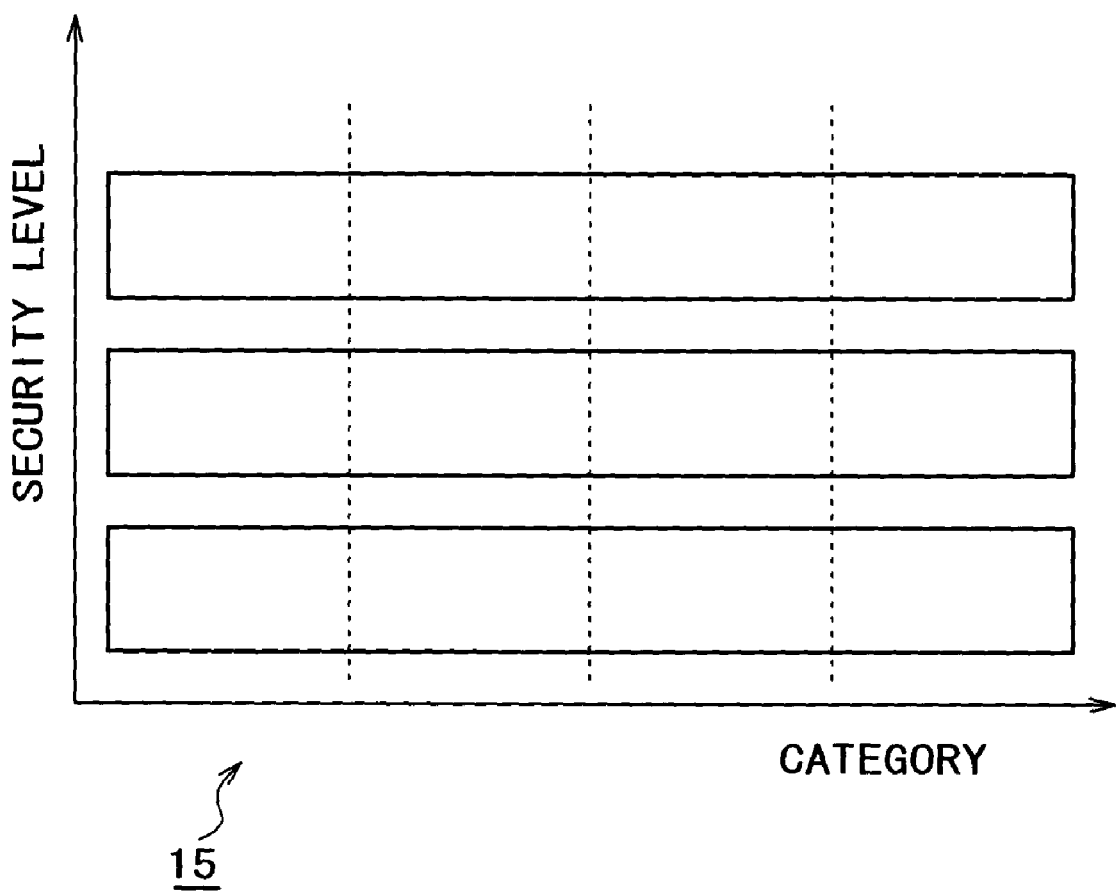

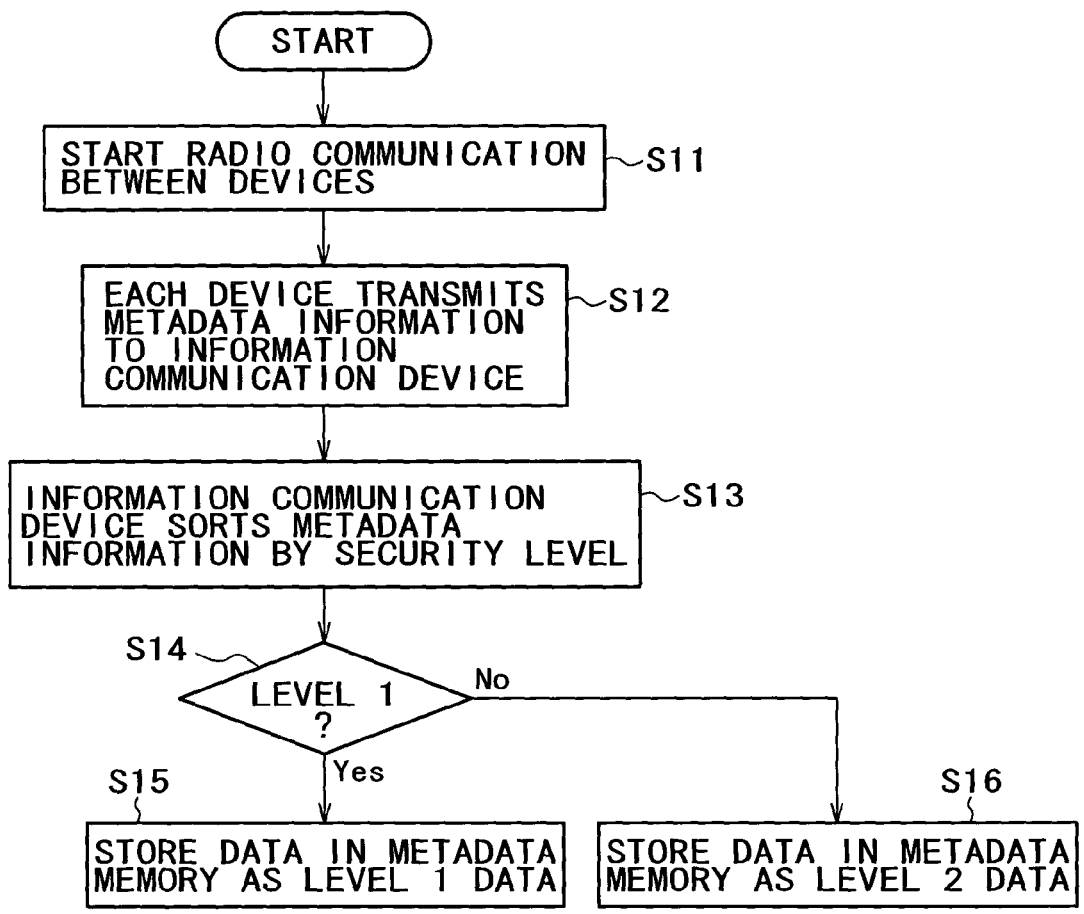

F I G. 7
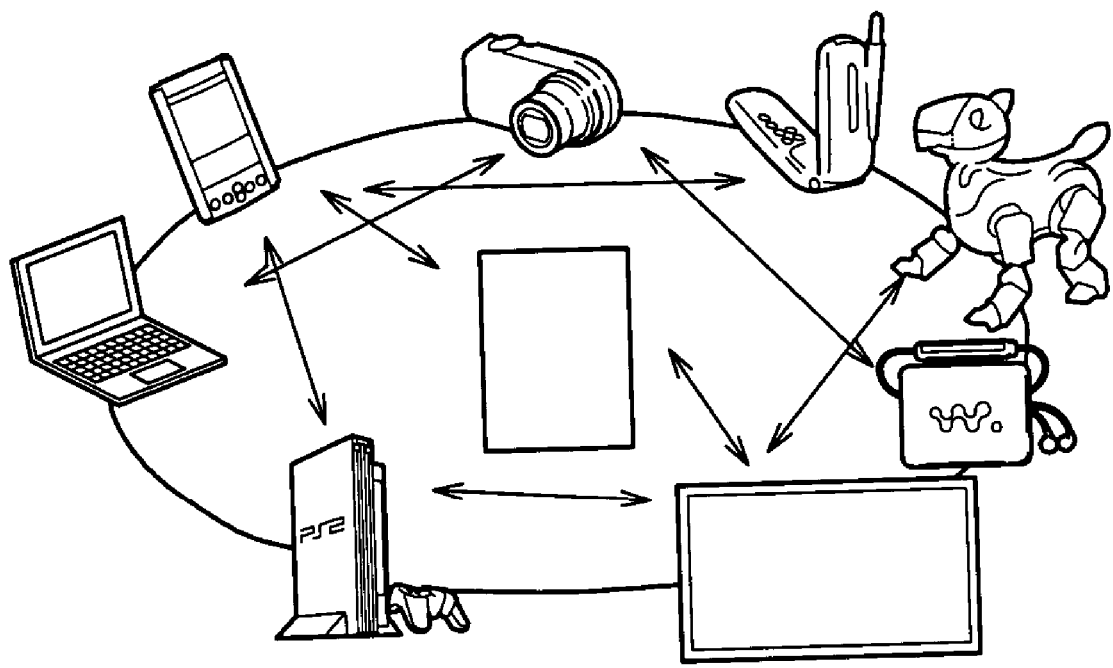

FIG. 9

ON HIS WAY HOME FROM A PLACE WHERE HE HAS GONE, A MAN A (42 YEARS OLD) HAPPENS TO FIND A BAR AND DROPS IN. HE DRINKS AT THE COUNTER. AFTER A WHILE, ANOTHER MAN B SITS DOWN ON AN ADJACENT STOOL, WIPING OFF THE SWEAT. HE LOOKS TO BE OF THE SAME GENERATION AS MAN A.

MAN B "IT'S REALLY HOT. WORKING OUTSIDE IS HARD.
       DO YOU OFTEN COME HERE ?"
MAN A "NO. THIS IS THE FIRST TIME.
       I HAPPENED TO DROP IN TO HAVE A LITTLE NIP."

FOR A WHILE, THEY HAVE A SUPERFICIAL AND LIGHT CONVERSATION WITH EACH OTHER.

MAN B "DO YOU HAVE THIS ?
       SHALL WE TRY THIS FOR PLEASURE ?"
MAN A "OK. I HAVE ONE, TOO."

THEY TAKE THE RESPECTIVE INFORMATION COMMUNICATION DEVICES OUT OF THEIR BREAST POCKET AND DIRECT THEM TO A COMMUNICATION MACHINE MOUNTED WITH A SMALL LIQUID CRYSTAL DISPLAY ON THE COUNTER. THEY SET THEIR SECURITY LEVELS. MAN B'S SETTING, IS LEVEL 7 AND MAN A'S SETTING IS LEVEL 8. THEREFORE, LEVEL 8, THE HIGHER LEVEL SETTING, IS SELECTED, AND SEVERAL PIECES OF THEIR PAST DATA FOUND BY MATCHING ARE SHOWN IN THE DISPLAY SCREEN RIGHT IN FRONT OF THEM.

MAN A "GOSH ! THE SHINKANSEN ACCIDENT THREE WEEKS
       AGO. YOU WERE AT THE SCENE, TOO, WEREN'T YOU ?
       WHAT A COINCIDENCE !"

THEIR CONVERSATION LIVENS UP.

F I G. 1 0
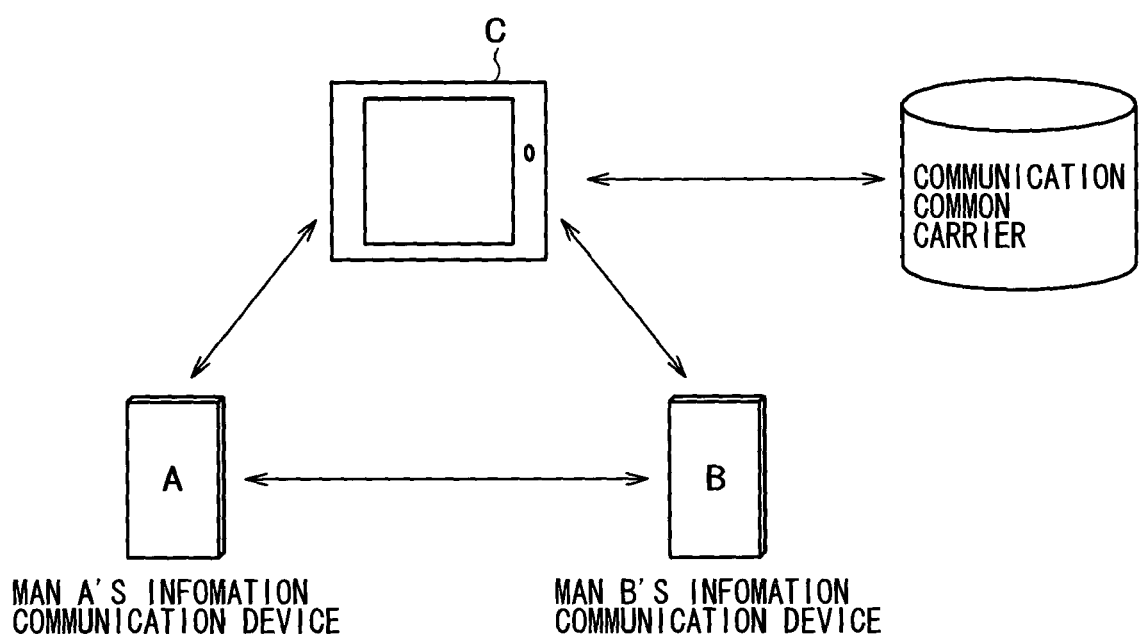

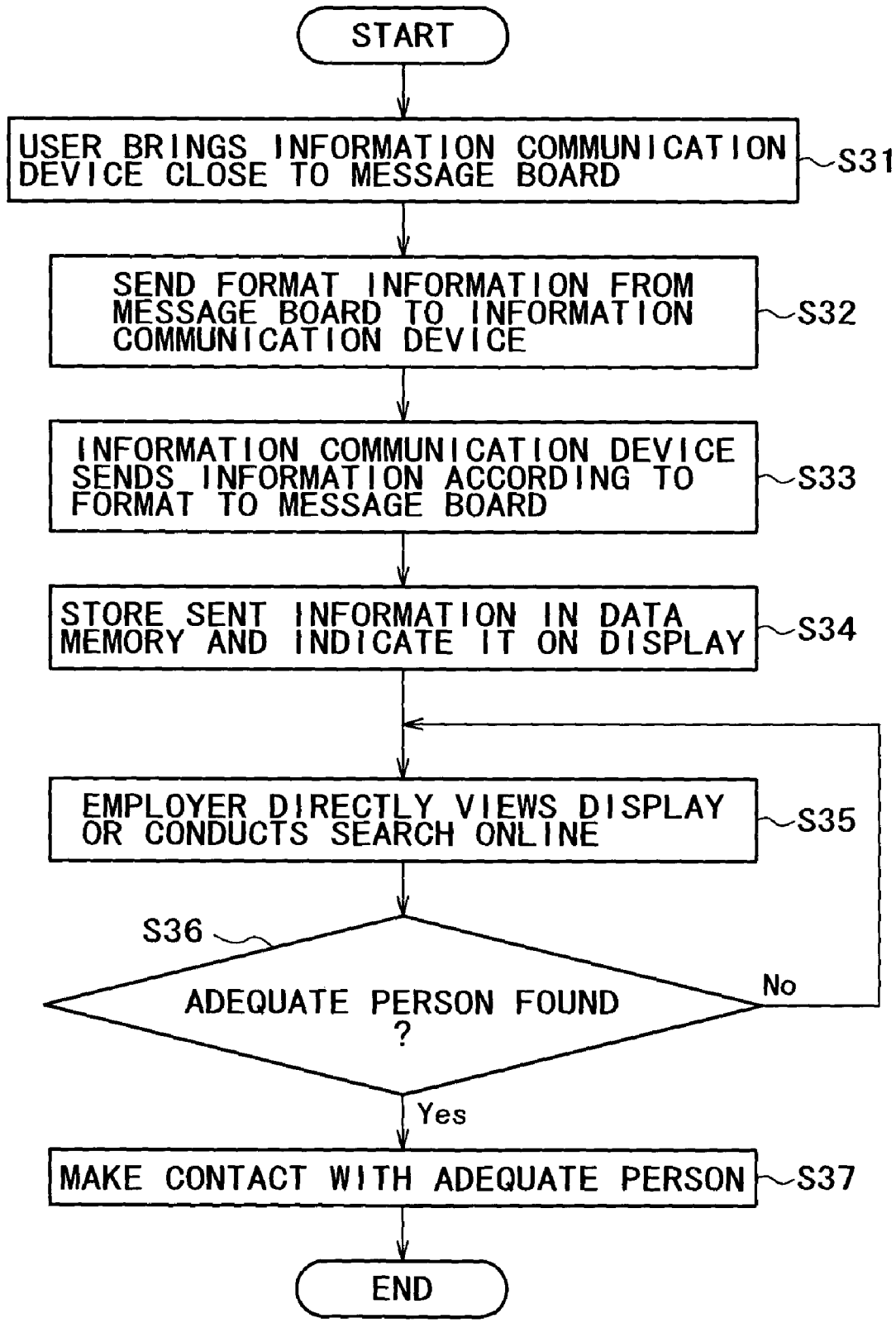

DEVICE AND METHOD FOR INFORMATION COMMUNICATION, SYSTEM AND METHOD FOR SUPPORTING INFORMATION EXCHANGE AND HUMAN RELATION FOSTERING, AND COMPUTER PROGRAM

BACKGROUND OF THE INVENTION

1. Field of the Invention

The present invention relates to a device and a method for information communication, a system and a method for supporting information exchange and human relation fostering, and a computer program which are used as a means for exchange information, opinions, and the like between persons. More particularly, the present invention relates to a device and a method for information communication, a system and a method for supporting information exchange and human relation fostering, and a computer program wherein a communicating means which supports information exchange as well as fostering of human relations is provided.

In further more particularly, the present invention relates to a device and a method for information communication, a system and a method for supporting information exchange and human relation fostering, and a computer program wherein face-to-face information exchange and fostering of human relations implemented by communication through the virtual world are supported.

2. Description of Related Art

Recently, computing technologies, such as information processing and information communication, have advanced by leaps and bounds, and computer systems have become widespread. Further, the demand for network computing technologies for interconnecting computers has increasingly grown. In environments with network connection, collaborative work, such as sharing of computer resources and sharing, circulation, distribution, and exchange of information, can be smoothly conducted.

An era in which we are connected though we do not want is expected to come in the near future. The present networks, including broadband, are defined by a problem of band and involve users' intention. In the above-mentioned era, contrarily, environments wherein users can utilize computer resources in the same manner (that is, consistently) wherever the users are will be provided.

Connection in a network in such an environment does not depend on individual work environments and thus such a network is called "ubiquitous network" or "environmental network." These networks are implemented by combining a plurality of technologies, including mobile electronic communications, always-on connection, and barrier-free interfaces.

In the present social surroundings, many of us benefit from computers in various scenes in industrial activities and everyday life. Therefore, the ubiquitous network can be said to be an integrant part for making the dream world come true. For example, business persons will be able to receive orders from their customers wherever the business persons are. The consuming public (users) will be able to have desired contents provided anytime.

As the size of circulated contents is increased owing to the ubiquitous network, communication between persons will be enriched without doubt. The virtual world in which their communications take place will become more and more realistic. Further, there is a possibility that a new style of communication, succeeding the present electronic mail, will be created and become widespread.

According to reports for the past 10 years, what married women living in Silicon Valley covet most is virtual wall. This is a mechanism for projecting the images of their favorite scenery onto an entire wall of their house. This system will also be able to project considerably realistic images in the near future. That is, most manufacturers' efforts in technological development will be directed to virtual communication.

Presently, computers have deeply penetrated into our everyday life and the construction of ubiquitous networks has been underway. Electronic mail has already become widespread as a handy and efficient means for communication.

With electronic mail, we can communicate with others through screen without being bothered with human relations. Also, electronic mail allows us to readily kill little idle times. These handiness and facileness of electronic mail have gotten it into widespread use, especially, among young people dwelling in cities. Electronic mail has another convenience—we can communicate with acquaintances dwelling overseas regardless of time differences. Electronic mail is suitable for the lives of moderns without doubt.

The proliferation of IT (Information Technology) has digitalized means for mingling with others. As a result, superficial relationship with others has been easier to maintain but human relations have been metamorphosed or attenuated somehow. In other words, there is a concern that moderns will reduce opportunities for face-to-face communication and eventually come to communicate with others only through the virtual world.

SUMMARY OF THE INVENTION

The present invention has been made in view of the above-mentioned technical and social problems. A major object thereof is to provide a device and a method for information communication, a system and a method for supporting information exchange and human relation fostering, and a computer program wherein an excellent communicating means which favorably supports information exchange as well as fostering of human relations is provided.

Another object of the present invention is to provide a device and a method for information communication, a system and a method for supporting information exchange and human relation fostering, and a computer program wherein an excellent communicating means which favorably supports face-to-face information exchange and fostering of human relations implemented by communication through the virtual world.

The present invention has been made in view of the above-mentioned problems. A first aspect thereof is an information communication device which supports face-to-face information exchange and fostering of human relations. The information communication device comprises:

a radio communication unit which transmits and receives radio communication data;

a metadata storage unit for storing metadata; and a central control unit which controls storage of metadata in the metadata storage unit.

The central control unit partitions the metadata storage unit by security level and category and stores metadata, received through the radio communication unit, in areas matching in terms of security level and/or category. Further, in response to external access requests, the central control unit takes metadata out of storage areas matching in terms of security level and/or category and supplies the metadata.

A second aspect of the present invention is a method for information communication which supports face-to-face information exchange and fostering of human relations. The method involves:

a metadata storing step in which metadata acquired by radio communication is stored in an area matching in terms of security level and/or category in metadata memory; and a metadata reading step in which, in response to an external access request, metadata is taken out of a storage area matching in terms of security level and/or category in metadata memory and supplied.

A third aspect of the present invention is a system and a method for information exchange and human relation fostering which supports face-to-face information exchange and fostering of human relations on the virtual world. The system and method involve;

a metadata transmitting means or step for providing user terminals with metadata of respective security level and category here and there in the real world;

a metadata acquiring means or step for taking metadata matching in terms of security level and category out of user terminals;

a matching means or step for performing matching among pieces of metadata acquired from two or more user terminals; and a result of matching presenting means or step for presenting the result of matching.

However, "system" described here refers to a logical aggregate of a plurality of devices (or functional modules which perform specific functions), irrespective of whether each device or functional module is placed in a singe enclosure or not.

"Metadata" described here refers to information in the form of metadata, equivalent to a log stating that a user carrying an information communication device visits a place and what the place is. Metadata is sent out from transmitters installed here and there, for example, street corners and movie theaters, in the real world.

The information communication device of the present invention is constituted according to such form factors that the size and weight are reduced and the portability is enhanced. For example, the information communication device is constituted as card type. Or, it is built in portable equipment, such as PDAs and cellular phones.

Therefore, a user can carry the information communication device of the present invention. While the user moves around carrying the device, information abound the user's activities in the real world and other personal history information related to the user are accumulated in the device. As a result, the information communication device can function as a device for recognizing or identifying the user, that is, User Identify Module (UIM).

As mentioned above, information accumulated in the information communication device can be used for carrier planning, certification (authentication), communication (information exchange), and the like.

The system for supporting information exchange and human relation fostering of the present invention takes data out of one user's information communication device. Then, the system performs matching the data with data from another user's information communication device. The system represents the result of matching to both the users, and thereby favorably supports information exchange and fostering of human relations in the real world through the virtual world.

Though this is a very simple system, it is backed up by a psychological theory. According to the psychological theory, interpersonal relationship develops in five stages: encounter→experiment→cultivation of relationship→integration→solidification. The most important is the second stage, "experiment" stage. In the "experiment" stage, persons sound out each other through small talk or superficial conversation. Trying to find topics related to hobbies and issues which can be shared between them without restraining themselves, they judge whether this interpersonal relationship should be developed.

Moderns are unaccustomed to face-to-face communication and often put up barriers before they cannot find a subject common to themselves and their conversation partners. With the present invention, people can easily find common subjects to gradually develop superficial communication to heart-to-heart communication. Then, the people can exchange rich information and can easily and properly judge whether they should go ahead to the next "cultivation of relationship" stage.

The information communication device of the present invention may be further provided with a user input unit for the user of the device to write metadata directly into the metadata storage unit. In this case, each time an event occurs, the user can directly input comment on the event into the information communication device and use the device in place of a diary.

Accumulations of metadata a user receives here and there, for example, at street corners, in the real world are private information. To cope with this, in the device or method for information communication of the present invention, for example, the following measures can be taken: when metadata is stored, a higher security level is set for data transmitted through a relatively secure communication path and a lower security level is set for other transmitted data.

Further, in the device or method for information communication of the present invention, a character to be called virtual person corresponding to the user may be brought up based on the user's history information stored in the metadata storage unit. Such a character is called companion. The companion grows with the user while the user moves around carrying the information communication device.

The security level is a criterion for determining to what extent the past of the user can be disclosed. In case of intimate relationship, the security level of the same information may be lowered. Further, in the system for supporting information exchange and human relation fostering of the present invention, the above-mentioned matching means or step may be implemented in accordance with the higher security level.

A fourth aspect of the present invention is a computer program described in a computer-readable format so that information communication processing for supporting information exchange and fostering of human relations is performed on a computer system. The program involves:

a metadata storing step in which metadata acquired by radio communication is stored in an area matching in terms of security level and/or category in metadata memory; and a metadata reading step in which, in response to an external access request, metadata is taken out of a storage area matching in terms of security level and/or category in the metadata memory and supplied.

A fifth aspect of the present invention is a computer program described in a computer-readable format so that processing for supporting information exchange and fostering of human relations on the virtual world is performed on a computer system. The program involves:

a metadata transmitting step in which metadata of respective security level and category is provided to user terminals here and there in the real world;

a metadata acquiring step in which metadata matching in terms of security level and category is taken out of user terminals;

a matching step in which matching is performed among pieces of metadata acquired from two or more user terminals; and a result of matching presenting step in which the result of matching is presented.

The computer program according to the fourth and fifth aspects of the present invention is defined as a computer program described in a computer-readable format so that predetermined processing is performed on a computer system. In other words, collaborative action is produced on a computer system by installing the computer program according to the fourth and fifth aspect of the present invention on the computer system. Thus, the same action and effect as in the device or method for information communication according to the first and second aspects of the present invention, or in the method for supporting information exchange and human relation fostering according the third aspect of the present invention are produced.

Other and further objects, features, and advantages of the present invention will be apparent from the embodiments of the present invention described below and the more detailed description in connection with the accompanying drawings.

BRIEF DESCRIPTION OF THE DRAWINGS

FIG. 2 is a drawing schematically illustrating the makeup of the memory space in the metadata memory 15.

FIG. 4 is a flowchart illustrating an operating procedure for writing radio communication data into the metadata memory 15.

FIG. 5 is a drawing illustrating an example of the constitution of a security table.

FIG. 7 is a drawing illustrating the way devices are wireless-connected with one another in the same work environment.

FIG. 9 is a scenario depicting one scene wherein the present invention is used.

FIG. 10 is a drawing schematically illustrating an example of the configuration of a system comprising users' information communication devices 1 and a communication machine.

FIG. 13 is a flowchart illustrating an operating procedure for displaying information acquired from a user's information communication device on the message board in the message board system 3.

DETAILED DESCRIPTION OF THE PREFERRED EMBODIMENTS

Figure 1:
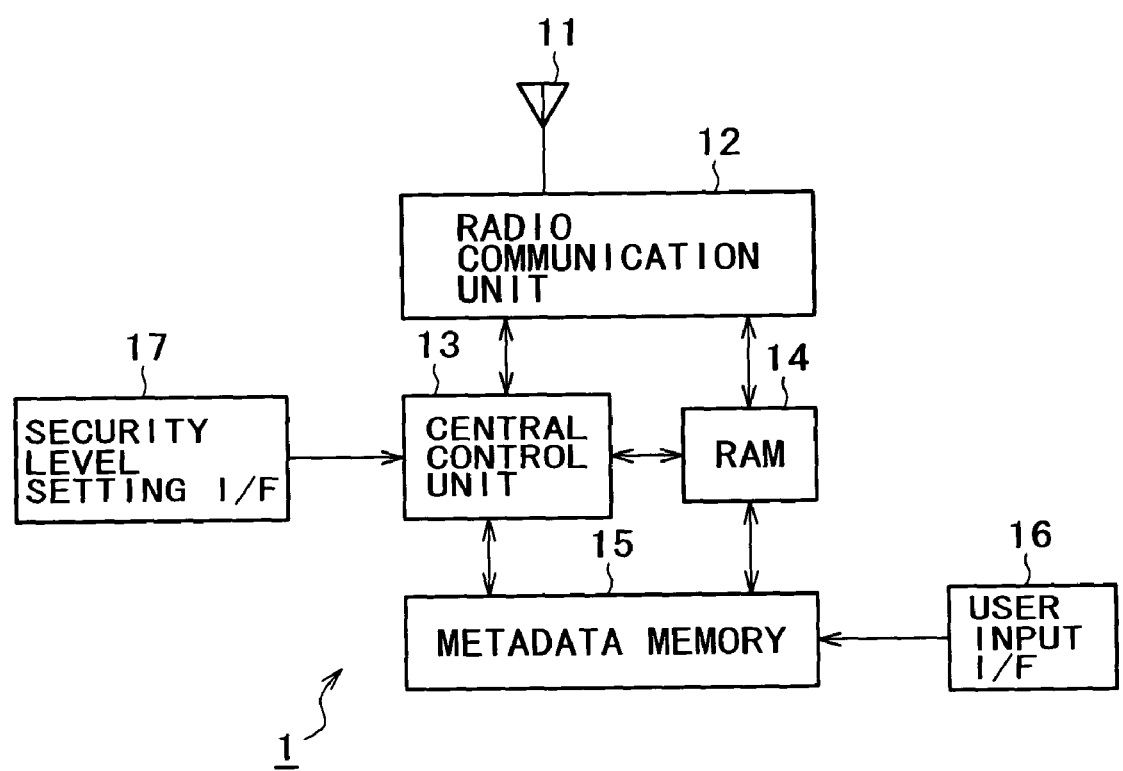
FIG. 1 is a drawing schematically illustrating the composition of the functional blocks of the information communication device 1 to which the present invention is applied.

Referring to the drawings, embodiments of the present invention will be described in details below.

A. System Configuration

The present invention is intended to favorably support face-to-face information exchange and fostering of human relations implemented by communication through the virtual world. More specifically, according to the present invention, a user's personal information and other real-world information related to the user are taken one after another into a portable information communication device with memory incorporated. Further, data is taken out of the information communication device and matched with data from another user's information communication device. Thus, the present invention supports information exchange and fostering of human relations in the real world through the virtual world.

FIG. 1 schematically illustrates the composition of the functional blocks of the information communication device 1 to which the present invention is applied. As illustrated in the figure, the information communication device 1 comprises an antenna 11, a radio communication unit 12, a central control unit 13, RAM (Random Access Memory) 14, metadata memory 15, a user input interface 16, and a security level setting interface 17.

The radio communication unit 12 performs transmission/reception processing, such as modulation/demodulation and encoding/decoding of radio communication data, through the antenna 11. Non-contact data communication based on electromagnetic induction used in IC cards and RF-ID, and a short-range data transmission method such as Bluetooth, can be used in the radio communication referred to here.

The central control unit 13 controls the operation of the entire device 1, including data transmission/reception processing and metadata memory management, by executing predetermined program code.

The RAM 14 functions as a working storage for the central control unit 13 or a buffer for transmitted and received data.

The metadata memory 15 stores real-world information, obtained through the antenna 11 and the radio communication unit 12, under the control of the central control unit 13.

There are transmitters (not shown) scattered in the real world for providing the information communication devices 1 with real-world information. The transmitters provide information communication devices 1 carried by users with information in the form of metadata. This information is equivalent to a log stating that a user visits a place and what the place is. This type of information has a respective category indicating the use and purpose thereof. Since the information relates to users' personal behavior (privacy), the information further has a respective security level.

FIG. 2 schematically illustrates the make up of the memory space in the metadata memory 15. As illustrated in the figure, the memory space is partitioned by category and by security level. Taken in from a transmitter through the antenna 11 and the radio communication unit 12, the real-world information is stored in an appropriate partitioned area in the memory space under the control of the central control unit 13. When data is read out of the metadata memory 15, data under the appropriate category is identified by matching or the like. Then only the data is taken out of the memory space to the extent that a security level permitted by a predetermined authenticating procedure is not exceeded. The data is sent out through the radio communication unit 12 and the antenna 11.

The user input interface 16 comprises keys, buttons, a touch pad, and the like, and receives character data or data in other forms entered by the user. The user can write real-world information directly into specified partitioned areas in the metadata memory 15 through this user input interface 16. Also, the user can edit or delete data stored in the metadata memory 15.

The security level setting interface 17 is an interface for setting and changing security levels for partitioning and managing the memory space in the metadata memory 15 and for changing the setting.

There are transmitters scattered in the real world and the information communication device 1 receives information in the form of metadata from the transmitters. This information is equivalent to a log stating that the user visits a place and what the place is. The information communication device 1 writes the information into the metadata memory 15 one after another. Information related to the user's activities in the real world and other history information (personal history) related to the user are accumulated in this portable information communication device 1. As a result, the device can function as a device for recognizing or identifying the user, that is, User Identify Module (UIM).

Figure 3:
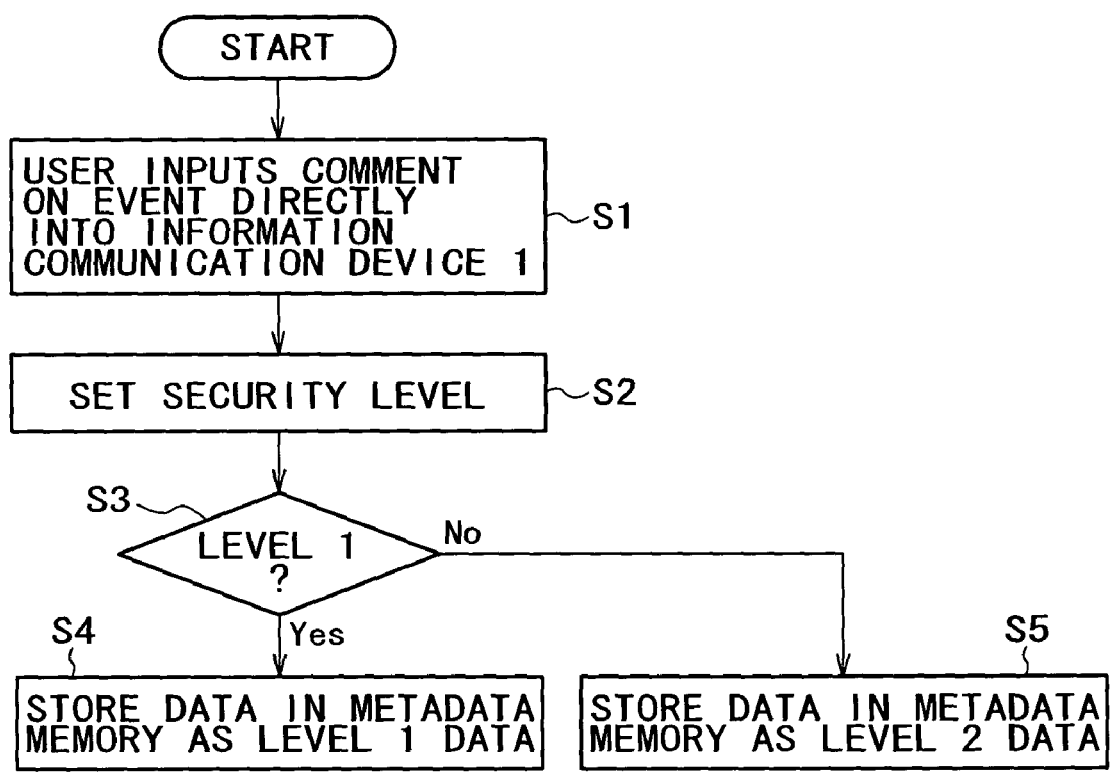
FIG. 3 is a flowchart illustrating an operating procedure for a user to write information directly into the metadata memory 15.

FIG. 3 illustrates an operating procedure for the user to write information directly into the metadata memory 15, in the form of flowchart. This operating procedure is actually implemented as a result of the following action: a user interaction takes place through the user input interface 16, and the central control unit 13 in execution of predetermined program code processes the interaction.

First, the user directly inputs comment on an event using the user input interface 16 (Step 1).

Next, a security level set during manual input is confirmed (Steps 2 and 3).

If the manually inputted security level is always set to Level 2, the input data is designated as Level 2 data and stored in a corresponding area in the metadata memory 15 (Step 5). If inputted information is recognized as Level 1 information, the information is stored in a partitioned area designated as Level 1 in the metadata memory 15 (Step 4)

According to the procedure illustrated in FIG. 3, the user can directly input comment on an event when the event occurs. Thus, the user can use the information communication device 1 in place of a diary.

Unexpectedly, a lot of people keep a diary. Some people have their diary on view to the public on the web. Such active people can write their diary into the information communication device 1. On the assumption that the information communication device 1 is essentially an integrated mobile device (mentioned above), the device can be used to briefly record experiences through such a text input function. As this system becomes widespread, it is expected that users will become willing to take notes. Further, with the voice recognition technology developed, the system may be so constituted that speech is turned into text and accumulated in the information communication device 1.

FIG. 4 illustrates an operating procedure for writing information, received from an external transmitter through the antenna 11 and the radio communication unit 12, into the metadata memory 15 in the form of flowchart. This operating procedure is actually implemented as a result of the following action: the central control unit 13 in execution of predetermined program code processes radio communication data.

Here, it is assumed that all the products are adapted to wireless communication and metadata is added to every transmission data thereof. Also, it is assumed that the security level is set in two levels.

First, radio communication is started between devices, and the devices exchange varied data with one another (Step 11). The devices transmit metadata information to the information communication device 1 carried by a user (Step 12).

For example, game data of a baseball team is transmitted from a turner to a wall-mounted television. In this case, the metadata information thereof is sent to the information communication device 1 by air with certain frequency.

The information communication device 1 receives the radio communication data and stores the input data in the metadata memory 15. At this time, the information communication device 1 sorts these pieces of data by preset security level and checks the security level thereof (Steps 13 and 14).

The information communication device 1 has such a security table as illustrated in FIG. 5 therein and makes a comparison therewith. In the example illustrated in the figure, the security level is set as follow: the higher security level is set for data transmitted through a relatively secure communication path, such as telephone and electronic mail. The lower security level is set for every other transmitted data.

Received data whose security level is set to Level 2 is stored as Level 2 data in a corresponding area in the metadata memory 15 (Step 16). If received data is recognized as Level 1 data, the data is stored in a partitioned area designated as Level 1 in the metadata memory 15 (Step 15).

For example, metadata related to a TV program will be considered. According to the security table in FIG. 5, this metadata is classified as Level 1 data, and is stored in the metadata memory 15 as described in the box for Step 15. Metadata related to communication is stored in the metadata memory 15 as described in the box for Step 16.

Figure 6:
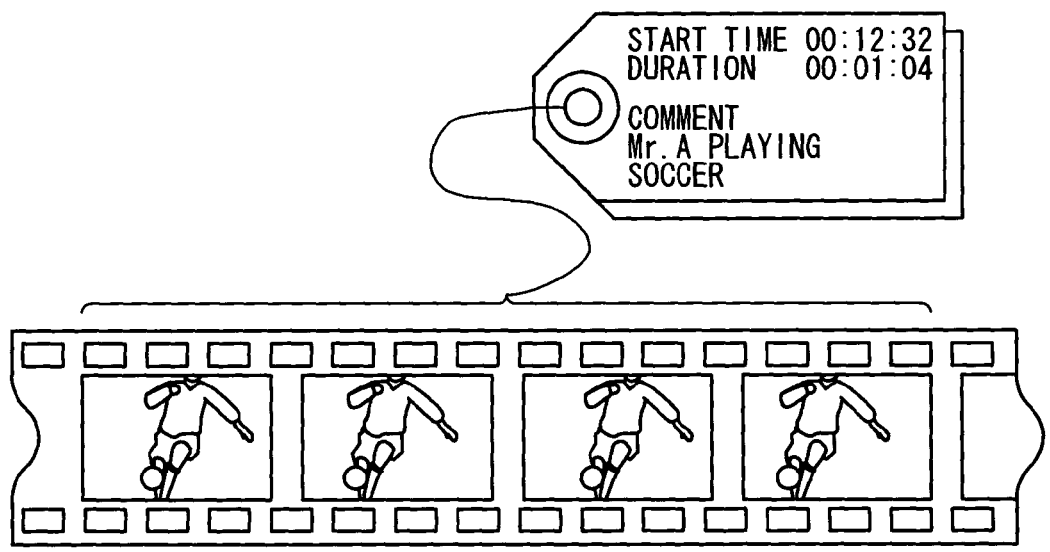
FIG. 6 is a conceptual drawing of metadata.

Fusion of broadcasting and communications is expected to progress to some degree in the near future. In such an environment, each data is provided with data (header) indicating the contents of the data. In general, this content indicating data is called metadata. FIG. 6 is a conceptual drawing of metadata. In the example illustrated in the figure, "recording duration" and "description of image" are added to image data showing a scene wherein someone is playing soccer. The tag in the figure corresponds to metadata. With respect to MPEG7, some type of metadata has been already standardized. It becomes possible to random-access broadcast data and search the contents thereof by adding metadata to the data. All the devices will adopt metadata.

It is assumed that devices are connected with one another through a wireless local network. FIG. 7 illustrates the way devices are wireless-connected in the same work environment. Even at present, 100 Mbps can be sufficiently transmitted within the range permitted by law by adopting a UWB (Ultra WideBand) method. It is predicted that 600-Mbps transmission will be implemented in several years. A device adopting a UWB method is very small in the scale of circuitry and the power consumption thereof is low and on the order of a few hundreds of mW. Installation of the device in mobile devices does not pose any problem. Though a transmission distance of 100 m is difficult to attain, there is a high possibility that wireless communication between local devices will be implemented.

With use of this radio communication, metadata of each device is accumulated in the information communication device 1 carried by a user without the user's knowing. For example, information about what TV program the user watched and what music the user listened to is accumulated. Of course, these pieces of information are provided with subtilized levels by default, and filed according to the security level thereof.

Figure 8:
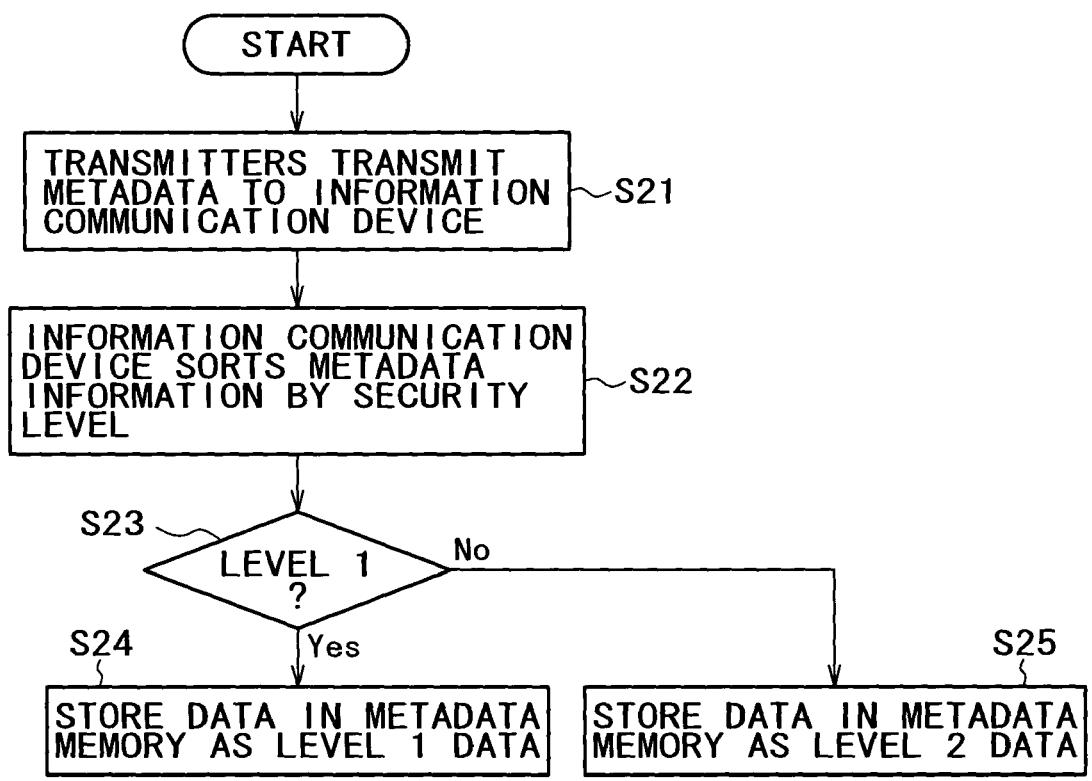
FIG. 8 is a flowchart illustrating another example of the operating procedure for writing radio communication data into the metadata memory 15.

FIG. 8 illustrate an another example of the operating procedure for writing information, received from an external transmitter through the antenna 11 and the radio communication unit 12, into the metadata memory 15. This figure is presented in the form of flowchart as well. This operating procedure is actually implemented as a result of the following action: the central control unit 13 in execution of predetermined program code processes radio communication data. In this example, it is assumed that transmitters are installed here and there, for example, at street corners and in movie theaters, in the real world. Metadata is automatically written into the information communication devices 1.

Here, it is assumed that all the products are adapted to wireless communication and metadata is added to every transmission data thereof. Also, it is assumed that the security level is set in two levels.

A user carrying the information communication device 1 comes in a work space. Then, transmitters present in this space transmit metadata information to the information communication device 1 (Step 21). For example, a transmitter is installed in a movie theater. When the user carrying the information communication device 1 comes in the theater, the transmitter transmits information the transmitter holds to the information communication device 1.

The information communication device 1 receives the radio communication data and stores the input data in the metadata memory 15. At this time, the information communication device 1 sorts these pieces of data by preset security level and checks the security level thereof (Steps 22 and 23). The information communication device 1 has such a security table as illustrated in FIG. 5 and makes a comparison therewith.

Received data whose security level is set to Level 2 is stored as Level 2 data in a corresponding area in the metadata memory 15 (Step 25). If received data is recognized as Level 1 data, the data is stored in a partitioned area designated as Level 1 in the metadata memory 15 (Step 24).

According to the security table, metadata related to movies is classified as Level 1 data and is stored as Level 1 data as described in the box for Step 24. If metadata relates to communication, naturally, the metadata is stored as Level 2 data as described in the box for Step 25.

In the near future, everyone will be able to seamlessly use wireless environments wherever he/she is. Examples of such environments include restaurants, movie theaters, and bowling alleys. A transmitter is installed at the entrances to these facilities without exception. That is, an infrastructure for writing data as users' history information (history data) is built. When a user enters a movie theater, such information as "16:00, April 15, Titanic" is inputted to the information communication device 1 carried by the user.

The present invention is based on the assumption that all the past data can be accumulated in the metadata memory 15 in the information communication device 1 of the present invention. If the size of metadata is 64 bytes and 1000 inputs are made per day, the size of metadata written in a day is 64 kilobytes. The size of the metadata accumulated in a year is 24 megabytes. Even if the information communication device 1 is used for 100 years, the size of accumulated metadata is no more than 2.3 gigabytes. When the evolution of semiconductor processes and the evolution of data compression techniques are considered according to Moore's Law, 2.3 gigabytes can be said to be a value that can be reasonably attained in several years.

All the data within the information communication device 1 may be backed up by a home server in case the device 1 is lost. Even if past data is seen by anyone, there is no problem because the data is nothing but metadata. Further, the data is protected through the public key infrastructure (PKI), and keys can be changed before the private key cannot be decrypted.

The information communication device 1 of the present invention is constituted as card type or any other module according to form factors which makes the device 1 suitable for carrying. Or, the information communication device 1 may be constituted as a wearable device using a cuff button or an earring the user usually wears. Naturally, the UIM function of the device 1 may be incorporated in existing portable products such as cellular phones and PDAs (Personal Digital Assistants).

As mentioned above, information accumulated in the information communication device 1 can be used for carrier planning, certification (authentication), communication (information exchange), and the like. These major uses for the information communication device 1 of the present invention are also called $C^3$ (cee square).

Further, a character to be called virtual person corresponding to the user may be brought up based on the user's history information stored in the metadata memory 15. Such a character is called companion. The companion grows with the user while the user moves around carrying the information communication device 1.

Uses for the information communication device 1 of the present invention will be described below.

B. Support for Real Communication:

FIG. 9 presents an example of a scenario depicting a scene which is created by using the information communication device 1 of the present invention to support real communication.

Each person (Men A and B) has his own information communication device 1. Information related to the past of the men is stored in the information communication devices 1. Several communication machines mounted with a small-sized liquid crystal display are set on a bar counter. The two men direct the antennas 11 of the information communication devices 1 they respectively possess toward one of the communication machines.

The communication machine reads past data from the respective information communication devices 1 and matches these pieces of data with each other. For example, they may have watched the same movie in the past or they may have graduated from the same high school. When unrelated persons unexpectedly find that they have something common, as shown in this example, they will feel closeness between them and their conversation will grow lively. This will happen even if they are complete strangers to each other.

As already stated, in the metadata memory 15 in the information communication device 1, the past information of the user is sorted by security level and managed on a level-by-level basis. (Refer to FIG. 2.) The security level referred to here is a criterion for determining to what extent the past of the user himself/herself can be disclosed. In case of intimate relationship, the security level of the same information may be lowered. Further, matching may be performed in accordance with the higher security level.

Though this is a very simple system, it is backed up a psychological theory. According to the psychological theory, interpersonal relationship develops in the following five stages: (Refer to "Communication in Development of Interpersonal Relationship" written by Miyahara.)

Encounter→Experiment→Cultivation of Relationship→Integration→Solidification

Face-to-face communication carried out in the individual stages has respective features. The inventor believes that the most important is the second stage, "experiment" stage. In the "encounter" stage which begins with a few words, both persons create an image of the other person in a short time. In the example illustrated in FIG. 9, it is this stage when Man B casually addresses himself to Man A. In the next "experiment" stage, persons sound out each other through small talk or superficial conversation. Trying to find topics related to hobbies and issues which can be shared between them without restraining themselves, they judge whether this interpersonal relationship should be developed.

The information communication device 1 of the present invention is capable of creating an opportunity for persons to find a topic common to them. Moderns are unaccustomed to face-to-face communication and often put up barriers before they cannot find a subject common to themselves and their conversation partners. If people can find a common subject, they can gradually develop superficial communication to heart-to-heard communication. Then, the people can exchange rich information and can easily and properly judge whether they should go ahead to the next "cultivation of relationship" stage.

Here, it should be fully understood that: "the higher the degree to which people share the same experiences is, the more effective communication which takes place between them is." According to the psychological theory, this is the point of the "experiment" stage. The information communication device 1 of the present invention supports this discovery of common topics by information technology through operation in cooperation with communication machines.

The communication machine is set on, for example, a bar counter and is mounted with a small-sized liquid crystal display. The communication machine draws past data out of the information communication devices 1 of users sitting at the counter, matches the pieces of data with each other, and outputs the result of matching to the display.

FIG. 10 schematically illustrates an example of the configuration of a system comprising users' information communication devices 1 and a communication machine.

In the figure, A and B respectively refer to the information communication devices 1 possessed by Man A and Man B. The past data of these men is accumulated in the respective information communication devices 1. To use this system, the information communication devices are connected to the communication machine, for example, through a local network using radio communication or infrared data communication.

When the information communication devices are connected to the system, the users thereof are authenticated using the public key infrastructure (PKI) or the like. First, the users are authenticated only for connection with the communication machine C. At this time, Man A's information communication device and the communication machine C exchange public keys with each other. Simultaneously, Man B's information communication device and the communication machine C exchange public keys with each other.

Subsequently, the communication machine C sucks up respective past data from the Man A and Man B's information communication devices. The communication machine C matches these pieces of metadata with each other, and outputs the result of matching to the liquid crystal display therein. That is, the users' information communication devices do not exchange data directly with each other. If data is exchanged through the respective communication facilities, either user's past data will be made to stream to the other user's information communication device. In this case, the users will not feel like using the system. This is why the system is constituted as mentioned above. Also, with respect to the communication machine, it is guaranteed to users that, after the system is used, all the data will be completely erased.

Figure 11:
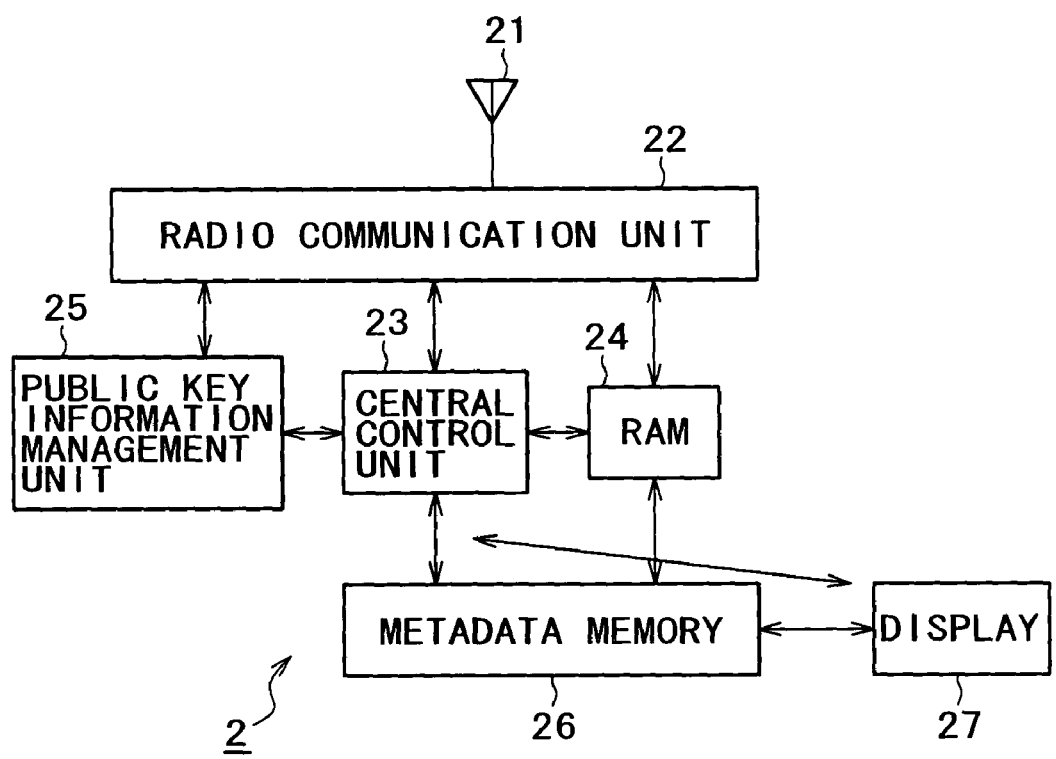
FIG. 11 is a drawing schematically illustrating the composition of the functional blocks of the communication machine.

FIG. 11 schematically illustrates the composition of the functional blocks of the communication machine 2. As illustrated in the figure, the communication machine 2 comprises an antenna 21, a radio communication unit 22, a central control unit 23, RAM 24, a public key information management unit 25, metadata memory 26, and a display 27.

The radio communication unit 22 performs data transmission/reception processing through the antenna 21 between the communication machine and information communication devices carried by nearby users. This transmission/reception processing includes modulation/demodulation and encoding/decoding of radio communication data. A short-range data transmission method, such as RF-IF, non-contact data communication based on electromagnetic induction used in IC cards, and Bluetooth, can be used in the radio communication referred to here.

The central control unit 23 controls the operation of the entire communication machine 2, including data transmission/reception processing and metadata memory management, by executing predetermined program code.

The RAM 24 functions as a working storage for the central control unit 23 or a buffer for transmitted and received data.

The public key information management unit 25 manages public key information for use in authentication performed when wireless connection with each user's information communication device is established.

The metadata memory 26 stores real-world information, obtained through the antenna 21 and the radio communication unit 22, under the control of the central control unit 23.

The display 27 comprises, for example, a liquid crystal display unit. The display 27 is used to display, for example, the result of matching of pieces of past data drawn out of individual users' information communication devices 1.

In the example illustrated in FIG. 10, the communication machine 2 first communicates with the information communication device possessed by Man A. The machine 2 and the device have public key information, respectively. The communication machine 2 holds public key information in the management unit 25 thereof, and first exchanges this information with the device. As a result, the information communication device possessed by Man A and the communication machine 2 are enabled to securely exchange information with each other.

Thereafter, past information from the information communication device possessed by Man A is temporarily stored in the RAM 24. It is confirmed that the data came from the information communication device possessed by Man A, and then the data is stored in the metadata memory 26.

The same operation is also performed with the information communication device possessed by Man B. Thus, metadata acquired both from Man A and from Man B is accumulated in the metadata memory. In case there are three or more persons, the same operation is further performed.

After data is accumulated in the metadata memory 26, the communication machine 2 performs matching of these pieces of data, and outputs the result of matching to the display 27.

The operation of the radio communication unit 22, the public key information management unit 25, the RAM 24, the metadata memory 26, and the display 27 is all controlled by the central control unit 23 in a centralized manner.

Necessity to identify each user when the user's connection with the communication machine 2 is established depends on the criticalness of individual applications. There is a high possibility that the information communication device 1 of the present invention is an integrated mobile device. There are also cases where the information communication device 1 is built in, for example, cellular phones. In the near future, the mainstream of cellular phones will be those of radio communication method called third generation mobile telecommunication (hereafter, abbreviated as "3G"). There are various types of 3G: CDMA-DS (W-CDMA) developed mainly in Japan and Europe and CDMA-MC (cdma2000) developed mainly in the U.S. One telephone used in a country cannot be used in another country where a different method is adopted. To cope with this, the ITU (International Telecommunication Union) has adopted a method in a standard designated as "IMT-2000" which is absolutely nothing less than 3G. The method is such that an common IC card is used regardless of the transmission method of telephones. Thus, even if two telephones are different in transmission method from each other, phone numbers and telephone bill information can be handed over from either telephone to the other. This is User Identity Module (UIM) card. If the UIM is provided with credit function, the 3G can be used for electronic money. If personal information can be recorded in the UIM card, the card can be used to identify persons.

In the embodiment of the present invention illustrated in FIG. 10, this UIM function may be used. To check into the identity of the user of the information communication device 1, an inquiry is made to the communication common carrier through the communication machine C. Thus, the user can be identified with information in the information communication device 1 using PIN (Public Identify Number) or the like.

Further examples of the application of the information communication device 1 to support for real communication will be described in details below.

B-1. Intra-Generational Communication

Young people mainly in their teens and twenties always seek encounters and communications. The above-mentioned system using the information communication device 1 of the present invention can be introduced in pubs and fast food shops for the young. Thus, an efficient communication area can be created in such places. In this case, such a shop is expected to operate as a so-called hotspot, and the proprietor can expect the enhanced pulling power of the shop. In the example presented as a scenario in FIG. 9, one-to-one matching is performed. If matching can be performed among more than two persons, the emergence of a new application can be expected.

Attention should be paid to the estimation that there will be the sufficient needs of "intra-generation communication" among elderly people. There are facilities called "senior citizen's colleges" in urban areas, and Professor Fujita conducted a survey on elderly people's motivations to have entered colleges. According to the report on the result of the survey (1985), 50 percent or more of them answered that their motivation is to find friends and communicate with them. With respect to surveys in homes for the aged or culture centers, the same results have been reported. As one of the reasons for the findings, the above-mentioned report points out that men account for as large a proportion to the enrollment at the senior citizen's colleges as 80 percent. Most elderly people are obsessed with the fixed idea that men should work on a job and women should manage their household. Accordingly, when a man retires, his human relations are cut off as a rule and he finds that he has no friend he can communicate with. Probably, that is why many old men hurry to enter senior citizen's colleges after their retirement. They want to find a friend.

Companies which are the fields of men's activities are vertically-structured societies and company organizations are often represented in a pyramidal shape. Usually, it takes much time for old men to accustom themselves to "horizontally-structured societies," such as senior citizen's colleges and homes for the aged. Many of them have trouble communicating. Some presents his name card with his former title, such as "Professor of XX University," lined out. Another purposely makes a new name card with his former title printed. They cannot enter into communication with others without use of such a name card. Such is the very scene where the communication support system illustrated in FIG. 10 favorably works. Especially, people of the same generation must have a lot in common, and can readily start communication with each other by matching of their past data.

B-2. Intergenerational Communication

The inventor takes special notice of the application of the communication support system, illustrated in FIG. 10, to intergenerational communication.

The mode of face-to-face communication varies depending on the ages of people involved in the communication. This is because the social situation in which people are involved and their physical and social capabilities vary depending on their ages. As for the mechanism of children's interpersonal behavior, the results of a lot of analyses have been reported by now in the fields of developmental psychology and child psychology. The mechanism of young people's interpersonal behavior has been also considered in psychology of adolescence. However, sufficient research has not been done on the mechanism of elderly people's interpersonal behavior or the mechanism of interpersonal behavior between elderly people and their juniors.

A comparative survey was conducted on the social want of elderly people and middle-aged people using a personality test for measuring social want, called EPPS. In 1980, the result of the survey was reported. According to the report, elderly people are not indifferent to middle-aged people by any means. On the contrary, they have a strong interest and would actively communicate with middle-aged people if they can find common topics. The result of the survey reveals that elderly people do not want such a relationship that they are under the care of others. They want to establish such a relationship that they are on the equal footings or they dominate. In this case as well, the communication support system, illustrated in FIG. 10, will be effectively utilized.

C. Message Board System

The message board system referred to here is suitable for use in job hunting and recruiting activities and the computerized match making industry. Information, such as age, sex, interests, body height, and education, required for search is specified on the message board system and only the desired information is acquired from information communication devices 1.

Figure 12:
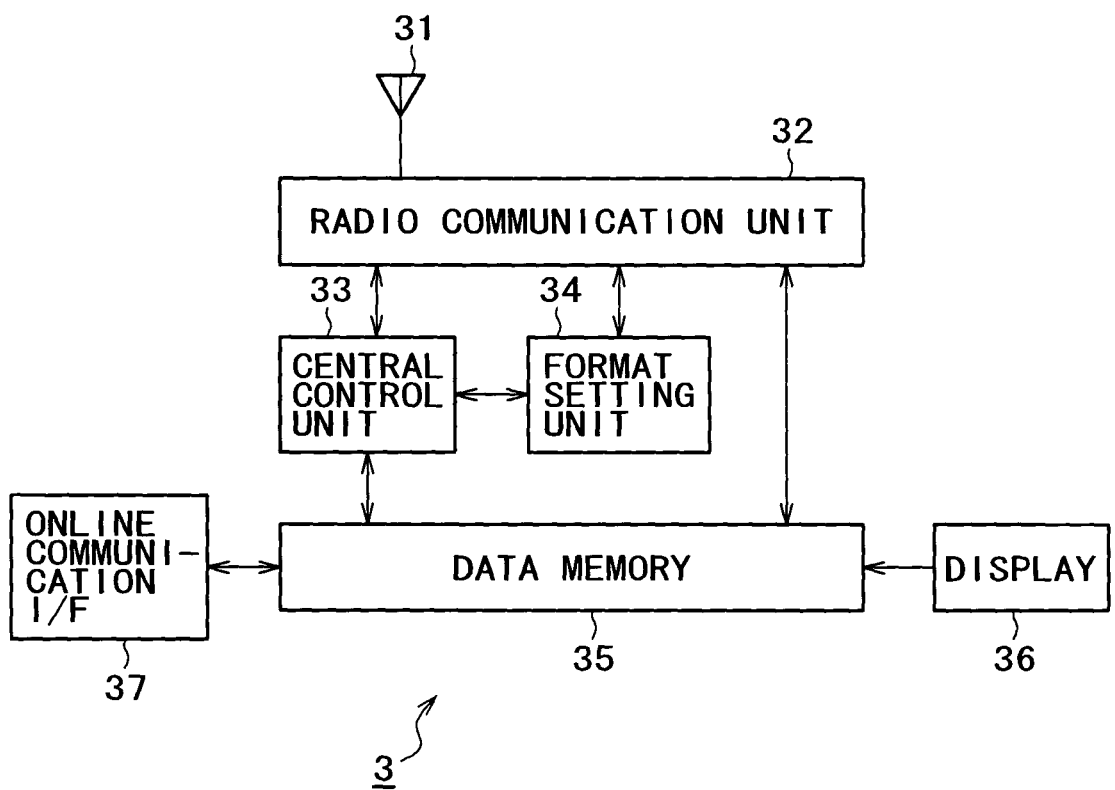
FIG. 12 is a drawing schematically illustrating the composition of the functional blocks of a message board system 3 to which the present invention is applied.

FIG. 12 schematically illustrates the composition of the functional blocks of the message board system 3 to which the present invention is applied. As illustrated in the figure, the message board system 3 comprises an antenna 31, a radio communication unit 32, a central control unit 33, a format setting unit 34, data memory 35, a display 36, and an online communication interface 37.

The radio communication unit 32 performs data transmission/reception processing through the antenna 31 between the message board system and information communication devices carried by nearby users. This transmission/reception processing includes modulation/demodulation and encoding/decoding of radio communication data. A short-range data transmission method, such as RF-IF, non-contact data communication based on electromagnetic induction used in IC cards, and Bluetooth, can be used in the radio communication referred to here.

The central control unit 33 controls the operation of the entire communication machine 2, including data transmission/reception processing and metadata memory management, by executing predetermined program code.

The format setting unit 34 manages information required for formatting past data accumulated in individual users' information communication devices 1 so that the data can be presented on the message board.

The data memory 15 stores data formatted for presentation on the message board.

The display 36 comprises, for example, a liquid crystal display unit. The display 36 is used to display, for example, data accumulated in the data memory 15 in a format specific to the message board.

The online communication interface 37 is used to go online to a specified information center (not shown) for content retrieval.

FIG. 13 illustrates an operating procedure for displaying information, acquired from users' information communication devices, on a message board in the message board system 3, in the form of flowchart. This operating procedure is actually implemented as a result of the following action: the central control unit 33 executes predetermined program code. As an example, a case where a user looks for a part-time job on the message board will be described below. The user can use the message board system, for example, when the user has some spare time but does not have money. The user brings his/her own information communication device 1 close to the message board system dedicated to part-time job hunting. Then, relevant information is presented on the message board and employers can find right persons based on the presented information.

First, a user seeking a part-time job brings his/her information communication device 1 close to the message board system 3 (Step 31).

The message board system 3 detects the information communication device 1 and transmits format setting information to the information communication device 1 (Step 32).

In response thereto, the information communication device 1 formats the past data of the user accumulated in the metadata memory 15 in accordance with the format setting information. Then, the information communication device 1 transmits the formatted data to the message board system 3 (Step 33).

The message board system 3 stores the information, acquired from the information communication device 1, in the data memory 35 and outputs the data to the display 36 (Step 34). The items displayed at this time are those written in the format setting information. This example is a case of part-time job seeking. At this time, therefore, such items as are usually written in a resume (e.g. age, sex, experience) are anonymously displayed.

Meanwhile, an employer directly views the indication on the display 36. Or, the employer establishes connection with the message board system 3 through the online communication interface 37 and conducts search online (Step 35).

If the employer cannot find an adequate person as the result of search on the message board system 3 (Step 36), the employer goes back to Step 35. Then, the employer sets criteria again.

If the employer finds an adequate person, the employer makes contact with the person (Step 37). The contacting method is optional and, for example, electronic mail or telephone can be used.

Up to this point, the present invention has been described in details referring to the specific embodiments. However, it is obvious that persons skilled in the art can modify or substitute the embodiments of the present invention to the extent that the substance of the present invention is not deviated from. That is, the present invention is disclosed in the form of exemplification, and the contents of the present specification should not be interpreted in a definite fashion. To evaluate the subject matter of the present invention, the section of the scope of claims should be taken into account.

As detailed above, according to the present invention, a device and a method for information communication, a system and a method for supporting information exchange and human relation fostering, and a computer program wherein an excellent communicating means capable of favorably supporting information exchange as well as fostering of human relations is provided are provided.

Further, according to the present invention, a device and a method for information communication, a system and a method for supporting information exchange and human relation fostering, and a computer program wherein an excellent communicating means capable of favorably supporting face-to-face information exchange and fostering of human relations implemented by communication through the virtual world is provided are provided.

The foregoing invention has been described in terms of preferred embodiments. However, those skilled, in the art will recognize that many variations of such embodiments exist. Such variations are intended to be within the scope of the present invention and the appended claims.

What is claimed is:

1. A mobile communication system which supports information exchange and fostering of human relations between a plurality of users, comprising:
   a mobile communication device comprising:
      a wireless communication unit configured to transmit and receive wireless communication data;
      a metadata storage unit configured to store, in the mobile communication device, metadata relating to activities and interests of a user of the mobile communication device, said metadata including a log providing information on locations visited by the user; and
      a central control unit configured to:
         manage the storage of metadata in said metadata storage unit,
         wherein said central control unit:
            partition said metadata storage unit by security level and category,
            store metadata received through said wireless communication unit in a corresponding partition of the metadata storage unit based on matching the received metadata with a security level and category, wherein the metadata received through a secure communication path is set to a higher security level, and other data is set to a lower security level, and
            authenticate a stationary communication device according to a predetermined authenticating procedure;
         supply, to the stationary communication device, a first security level indicating a highest security level of metadata permitted to be transmitted from the mobile communication device to the stationary communication device, the first security level not to exceed a security level permitted by the predetermined authenticating procedure; and said stationary communication device configured to:
acquire said first security level and a second security level from another mobile communication device indicating a highest security level of metadata permitted to be transmitted from the another mobile communication device to the stationary communication device;
compare said first and said second security levels;
acquire metadata, which corresponds to the higher of the first and second security levels, from the mobile communication device and the another mobile communication device;
compare the acquired metadata; and
display common results from the acquired metadata based on the result of the comparison.

2. The information communication system according to claim 1, wherein the mobile communication device further comprises:
a user input unit for the user of the device to write metadata directly into said metadata storage unit.

3. The information communication system according to claim 1, wherein the mobile communication device further comprises:
a virtual person growing means which grows a virtual person corresponding to the user based on the user's history information accumulated in said metadata storage unit.

4. The information communication system according to claim 1, wherein the mobile communication device further comprises:
a format setting unit which converts the format of metadata taken out of said metadata storage unit as requested by a requesting party.

5. The information communication system according to claim 1, wherein the wireless communication device is configured to receive metadata transmitted from a device located at an entrance of a facility without first transmitting a request for the metadata.

6. A method for information communication which supports information exchange and fostering of human relations, comprising:
receiving metadata relating to activities and interests of a user of a mobile communication device via a wireless communication of the mobile communication device, said metadata including a log providing information on locations visited by the user;
partitioning a storage unit based on a security level and category to create a partitioned storage unit;
storing the received metadata in the partitioned storage unit of the mobile communication device based on matching the received metadata with a security level and category;
wherein the metadata received through a secure communication path is set to a higher security level, and other data is set to a lower security level, and
authenticating a stationary communication device according to a predetermined authenticating procedure;
supplying, to the stationary communication device, a first security level indicating a highest security level of metadata permitted to be transmitted from the mobile communication device to the stationary communication device, the first security level not to exceed a security level permitted by the predetermined authentication procedure;
acquiring, at the stationary communication device, said first security level and a second security level from another mobile communication device indicating a highest security level of metadata permitted to be transmitted from the another mobile communication device to the stationary communication device;
comparing, at the stationary communication device, said first and said second security levels;
acquiring, at the stationary communication device, metadata that corresponds to the higher of the first and second security levels, from the mobile communication device and the another mobile communication device;
comparing, at the stationary communication device, the acquired metadata; and
displaying, at the stationary communication device, common results from the acquired metadata based on the result of the comparison.

7. The method for information communication according to claim 6, wherein in said metadata storing step, data directly written by the user is stored.

8. The method for information communication according to claim 6, further comprising:
a virtual person growing step in which a virtual person corresponding to the user is grown based on the user's history information accumulated in said metadata memory.

9. The method for information communication according to claim 6, further comprising:
a format setting step in which the format of metadata taken out of said metadata memory is converted as requested by a requesting party.

10. The method for information communication according to claim 6, wherein receiving metadata includes receiving metadata transmitted from a device located at an entrance of a facility without first transmitting a request for the metadata.

11. A storage device including stored thereon a program which is written in a computer-readable format so that information communication for supporting information exchange and fostering of human relations is executed on a computer system, the program comprising:
receiving metadata relating to activities and interests of a user of a mobile communication device via a wireless communication of the mobile communication device, said metadata including a log providing information on locations visited by the user;
partitioning a storage unit based on a security level and category to create a partitioned storage unit;
storing the received metadata in the partitioned storage unit of the mobile communication device based on matching the received metadata with a security level and category;
wherein the metadata received through a secure communication path is set to a higher security level, and other data is set to a lower security level, and
authenticating a stationary communication device according to a predetermined authenticating procedure;
supplying, to the stationary communication device, a first security level indicating a highest security level of metadata permitted to be transmitted from the mobile communication device to the stationary communication device, the first security level not to exceed a security level permitted by the predetermined authentication procedure;
acquiring, at the stationary communication device, said first security level and a second security level from another mobile communication device indicating a highest security level of metadata permitted to be transmitted from the another mobile communication device to the stationary communication device;

comparing, at the stationary communication device, said first and said second security levels;

acquiring, at the stationary communication device, metadata that corresponds to the higher of the first and second security levels, from the mobile communication device and the another mobile communication device;

comparing, at the stationary communication device, the acquired metadata; and displaying, at the stationary communication device, common results from the acquired metadata based on the result of the comparison.

12. The computer readable medium of claim 11, wherein receiving metadata includes receiving metadata transmitted from a device located at an entrance of a facility without first transmitting a request for the metadata.

* * * * *